United States Patent Office 3,540,854
Patented Nov. 17, 1970

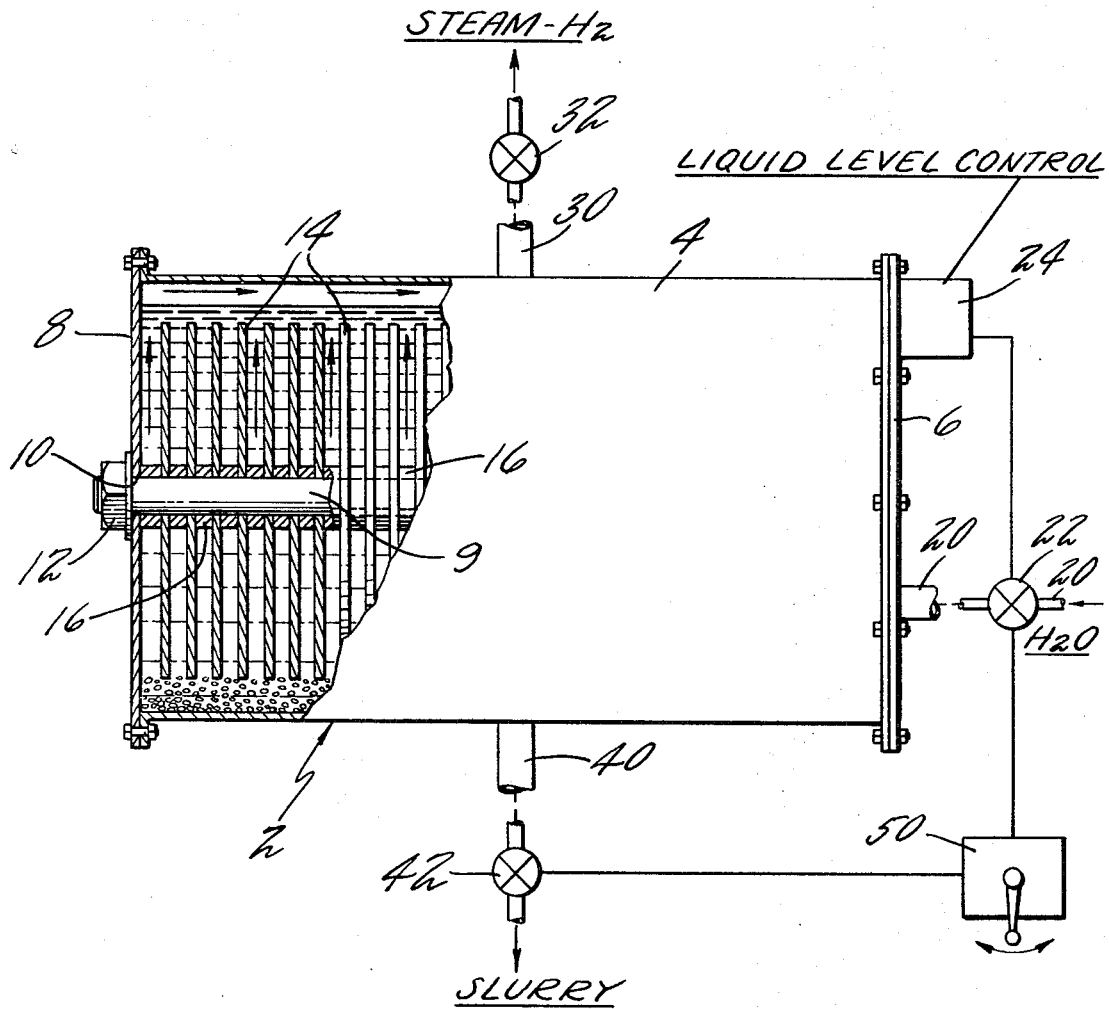

3,540,854
METAL-WATER FUELED REACTOR FOR GENERATING STEAM AND HYDROGEN
Arthur W. Brooke, Jr., and Robert A. Bean, Lake Park, Fla., assignors to United Aircraft Corporation, East Hartford, Conn., a corporation of Delaware
Filed May 26, 1967, Ser. No. 641,539
Int. Cl. B01j 7/02; C01b 1/07
U.S. Cl. 23—282          7 Claims

ABSTRACT OF THE DISCLOSURE

A reactor for producing steam and hydrogen wherein metal plates having amalgamated surfaces are fixedly positioned in a closed container so that the plates are aligned and spaced one from the other. In operation, the plates are completely submerged in water. The reaction between the water and the amalgamated plates provides an output of steam and hydrogen. For the plates, any of the metals selected from the group consisting of aluminum, beryllium, zirconium, magnesium, titanium, chromium and mixtures and alloys containing at least one of the foregoing may be used.

BACKGROUND OF THE INVENTION

A reactor of this type is not known which has produced a substantially constant flow of hydrogen and steam with a short period of time from starting to steady-state operation and with a relatively small size.

One prior art patent known to the inventors is set forth below:
Pat. No. 2,623,812, E. M. D. Eborall et al., Production of Hydrogen.

SUMMARY OF THE INVENTION

It is a primary object of this invention to provide a reactor which will have the capability to provide a substantially constant output flow of hydrogen and steam from the start of its operation to the end. This reactor could especially be used for an underwater or remote area power system.

The present invention spaces a plurality of plates of narrow thickness so as to substantially fill a container. The amalgam prevents the formation of a protective oxide on the aluminum surfaces. The aluminum within the amalgam film reacts with water and forms hydrogen and aluminum oxide or aluminum hydroxide. The heat evolved from the reaction vaporizes the water to form steam. Solid particles formed during this process do not remain on the surface of the plates but fall off into the water forming a slurry. Means can be provided to remove this slurry from the container or the slurry may remain in the reactor.

A liquid level control operates at all times to maintain a predetermined level. A control can be provided to anticipate the loss of water with slurry removal and permit water to enter the container and replace the water being removed with the slurry. A reaction can occur in this reactor at temperatures as low as 75° F.; however, the reaction rate will increase with increasing temperatures. In a typical installation, the reaction in this reactor would be carried out below the critical temperature of water, 704° F. The exhaust gas stream from this reactor contains no solid particles.

BRIEF DESCRIPTION OF THE DRAWING

The figure is a schematic view cut away showing the basic construction of the reactor.

DESCRIPTION OF THE PREFERRED EMBODIMENT

The reactor 2 shown in the figure consists primarily of a cylindrical container 4 having two removable circular ends 6 and 8. One end 6 is formed having a rod 9 projecting from the center thereof. This rod can be made integral or fixed by any other known means. In its end closing position, the free end of the rod 9 projects from the other end of the cylindrical container 4. To complete a closed container, the other end 8 is placed with a center opening 10 over the free end of the rod 9 and a nut 12 is threadably secured to the free end of the rod to fixedly position the rod with respect to both ends.

Between the inner faces of the ends 6 and 8, a plurality of circular plates 14 are positioned along the rod with spacing washers 16 also located along the rod, one each between each pair of plates and one between each end 6 and 8 and adjacent plate 14. It can be seen that the width of the washer will indicate the spacing of the plates and the diameter of the plates will determine the space at the top of the container and the room for the slurry at the bottom. It is necessary that the spacing between plates allows for the passage of water and for the reaction products to escape. Each end 6 and 8 can have any known sealing means desired between the ends and the container and the ends and the rod 9. The ends 6 and 8 of the container can also be affixed around their circumference to the cylindrical container by bolts or other known attaching means. While the plates and container have been described as circular, the shape most adaptable for a torpedo for example, other shapes can be used as required by location.

A supply of water is connected to the container by a conduit 20. A valve 22 in the conduit controls the flow of water. This valve can be controlled manually and by an automatic means 50 and control 24 to be hereinafter discussed.

A liquid level control 24 is connected to said reactor so that a predetermined level of water can be maintained within the reactor. This liquid level control can be of any known design wherein excess water can be bled off at a predetermined height and either fed overboard or back to a water supply. A shortage of water opens valve 22 to bring the level to its proper height.

The output of the reactor is passed through a conduit 30 and this is controlled by a valve 32. While not shown, this valve can be controlled by any means desired for releasing the steam and hydrogen from the reactor.

A conduit 40 extends from the bottom of the container and this conduit is controlled by a valve 42. This conduit is for draining a slurry which forms in the bottom of the container. This valve can be controlled both directly manually or remotely by a control means 50 to be hereinafter discussed.

The control 50 is merely a device which, when it opens valve 42, it also opens valve 22 to replace any liquid removed with the slurry. This control can be any means for so interconnecting two valves.

The chemical equation for the aluminum water reaction in this reactor is as follows:

(1) 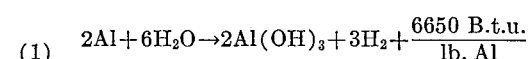

(2) 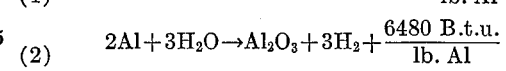

or a combination of both. Higher pressures and lower temperatures usually result in Reaction 1 and lower pressures and higher temperatures usually result in Reaction 2. In either case, the reaction is highly exothermic and the products are gaseous hydrogen and solid aluminum oxide and/or aluminum hydroxide.

The surface of the aluminum is amalgamated with a small amount of mercury. The amalgam formed is a liquid alloy of aluminum and mercury which is distributed at room temperature as a thin film on the surfaces and which consists largely of mercury with a small amount of dissolved aluminum. The amalgam tends to prevent the formation of a tightly bonded oxide coating that would normally stop or slow down the reaction.

In work which has been done, a reactor has had the aluminum reacted to completion with as little as .002″ between plates. In constructing a reactor, the surface area to thickness ratio of each plate should be made as large as possible to provide for a more constant output. This results in minimum surface area change during the reaction. For example, calculations show that after a 50% run duration, the surface area change of a .010″ thick by 10″ diameter plate was less than $1/10$ of 1% and the surface area change of a spherical pellet having the same weight of aluminum was 75%.

The reactor is generally operated at elevated pressures for two reasons. First, the working fluid generally must be at an elevated pressure so that it can later be expanded in a prime mover. The second reason is that the reactor temperature is permitted to be increased by increasing pressure while limiting the boiling point of the working fluid.

We claim:

1. A reactor for generating steam and hydrogen having in combination:
   (1) a container for containing a fluid under pressure,
   (2) a plurality of metal plates wherein the metal is a member selected from the group consisting of aluminum, beryllium, zirconium, magnesium, titanium, chromium, and alloys containing at least one of the foregoing, each of said metal plates having a high surface area to thickness ratio,
   (3) means fixedly mounting and spacing said plates apart in said container,
   (4) said plates being sized to substantially fill said container with an area being formed on the top thereof to collect the output of the reactor,
   (5) said plates being amalgamated with mercury, and
   (6) means for admitting water to said container.

2. A reactor as set forth in claim 1 wherein:
   (7) the output of the reactor is taken from the container by a conduit for delivery to another location.

3. A reactor as set forth in claim 1 wherein:
   (7) said plates are mounted on rod means fixed to said container with spacers located between adjacent plates to provide the proper distance for normal operation.

4. A reactor as set forth in claim 1 including:
   (7) means for removing a slurry from said container.

5. A reactor as set forth in claim 4 wherein:
   (8) said means for admitting water includes first valve means,
   (9) said means for removing a slurry from the bottom of said container includes second valve means,
   (10) means are included for coordinating both of said valve means to anticipate the loss of water with a slurry removal and immediately provide the necessary water whereby as said second valve means is opened said first valve means is also opened to immediately admit water.

6. A reactor as set forth in claim 4 wherein:
   (8) said means for admitting water includes first valve means,
   (9) said means for removing a slurry from the bottom of said container includes second valve means,
   (10) said container is shaped as a cylinder,
   (11) said means fixedly mounting and spacing said plates including:
      (a) a rod extending between each end of the container and being fixed thereto,
      (b) said plates each having an opening which positions said plate on said rod, and
      (c) spacers of a predetermined width placed around said rod between each pair of plates.

7. A reactor as set forth in claim 6 wherein:
   (12) means are included for coordinating both of said valve means to anticipate the loss of water with a slurry removal and immediately provide the necessary water whereby as said second valve means is opened said first valve means is also opened to immediately admit water.

References Cited

UNITED STATES PATENTS

| 2,362,966 | 11/1944 | Bertsch | 48—61 XR |
| 2,721,789 | 10/1955 | Gill | 23—282 |
| 2,823,075 | 2/1958 | Shirley | 23—288 XR |
| 3,091,520 | 5/1963 | Newburn | 23—288 |
| 3,348,919 | 10/1967 | Shumway | 23—211 |

FOREIGN PATENTS

| 573,907 | 4/1959 | Canada. |
| 413,967 | 7/1934 | Great Britain. |

OTHER REFERENCES

"Alloys Developing Hydrogen by Contact With Water," Scientific American; Oct. 24, 1914.

MORRIS O. WOLK, Primary Examiner

B. S. RICHMAN, Assistant Examiner

U.S. Cl. X.R.

23—211; 48—61